Oct. 21, 1958  H. J. STACEY  2,856,960
CONTROL VALVE WITH RELIEF AND UNLOADING MEANS
Filed Oct. 13, 1955  4 Sheets-Sheet 1

INVENTOR
Hugh J. Stacey
BY Dodge and Son
ATTORNEYS

Oct. 21, 1958    H. J. STACEY    2,856,960
CONTROL VALVE WITH RELIEF AND UNLOADING MEANS
Filed Oct. 13, 1955    4 Sheets-Sheet 3

INVENTOR
Hugh J. Stacey
BY Dodge and Son
ATTORNEYS

United States Patent Office 2,856,960
Patented Oct. 21, 1958

2,856,960

CONTROL VALVE WITH RELIEF AND UNLOADING MEANS

Hugh J. Stacey, Willoughby, Ohio, assignor to The New York Air Brake Company, a corporation of New Jersey Application October 13, 1955, Serial No. 540,313

17 Claims. (Cl. 137—621)

This invention relates to multiple control valves for hydraulic systems.

There is an increasing industrial demand for multiple control valves for use on earth-moving machinery, snow plows, lifts, etc. It is accepted practice to provide a bank of control valves at a central station. The valve bank may comprise a single cored housing in which all the control valves are housed or it may comprise a plurality of individual valve sections fastened together in a bank. The latter type is attractive from the manufacturer's point of view because individual sections may be kept in stock and may be assembled to suit the customer's requirements.

The flow paths of much multiple valves may be connected together in any one of three different ways. They may be connected so that in all positions of the valve the fluid flowing from each valve passes to the inlet of the next valve in a series of valves with a supply connection at one end of the series and an exhaust or sump connection at the other. This arrangement, which will hereinafter be called a series arrangement, is particularly useful when the motors controlled by individual valves are interdependently operated.

Commonly it is desirable to operate each motor independently of the others or simultaneously with another or other motors. In this case, each valve in the bank has at least one motor port adapted for connection selectively with an inlet manifold or an exhaust manifold. A by-pass passage is provided which affords a flow communication between the high pressure connection and the sump connection, which are located at opposite ends of the valve bank. This by-pass passage is connected serially past each of the control valves in the bank. It is open when all of the valves are in their neutral position but is closed whenever one or more valves is shifted from its neutral position. This by-pass passage is for the purpose of unloading the pump when none of the motors controlled by the valve bank is in operation. This type of arrangement of the control valves will be hereinafter referred to as a parallel arrangement.

A third arrangement is possible and is a combination of features of the series and parallel arrangements referred to. In this arrangement, liquid is supplied to the valve controlled motor from a path connected in series through the valves, but is exhausted from the motors through a manifold. This has the result that each motor must be separately actuated. This arrangement will be hereinafter referred to as a series-parallel arrangement.

Each of the different types of multiple valve has certain operating characteristics which must be considered in selecting the type of valve which is to be used. In the series type of multiple valve, it is possible to actuate a selected motor or it is possible to actuate two motors simultaneously. When two motors are actuated, the motor controlled by the valve which is more remote from the pressure supply, is actuated by fluid which is discharged from the other motor which is actuated. Thus it will be seen that the two motors operate interdependently because the rate of fluid supply to the second motor is dependent upon the rate of fluid exhaust from the first motor. In such an arrangement, if either motor is stalled (as it might be by an overload), both motors will stop.

Sometimes, however, it is desirable to operate the motors simultaneously but without any interdependence between the operation of the motors. In such a case, a parallel type of multiple valve would be used. When such a valve is being used and two motors are actuated, each motor draws fluid from the same intake manifold which is connected in parallel flow relation to the motors when the valves are in their active positions. There is a slight interdependence between the actuation of the motors because more fluid will flow from the parallel connected manifold to the motor which presents the least resistance to flow.

It is also frequently desirable to provide a multiple control valve in which the motors can be actuated only one at a time. Under these circumstances, a series-parallel type of valve is used. When any valve in a series-parallel multiple control valve is shifted from its neutral position, flow to other valves in the series more remote from the source of pressure supply, is cut off. By the same token, if one of the valves is in its active position and a valve between it and the source of pressure supply is shifted to its active position, further movement of the first operated motor is prevented until the later actuated control valve is returned to its neutral position.

The present invention is useful with both the parallel and series-parallel arrangements. The individual valves may be slide valves, plunger valves or rotary cocks. A slide valve comprises a valve member slidable on a flat seat. Each element contains ports which are brought selectively into registration by relative movement of the seat and valve members. If a slide valve member and its seat are curled or wrapped around an axis parallel to the direction of valve motion, a plunger valve is created. If a slide valve and its seat are curled or wrapped about an axis transverse to the direction of valve movement, a rotary cock is created. A slide valve normally is held to its seat by pressure acting on the valve to urge it toward its seat. Hence a slide valve is not a balanced valve. A plunger valve is easy to balance and plug cock type of valve may, in some cases, be balanced. The invention will be described as it is embodied in a piston or plunger valve, though its utility is not limited to use with this type of valve.

In multiple control valves of the parallel type, it is the usual practice to provide a by-pass passage from the supply connection to the sump connection which intersects the valve seats serially. This passage is open when all the valves are in their neutral or hold position. When any valve is shifted from its neutral position, the by-pass passage is closed and pressure builds up in the inlet manifold. The rate of closure of the by-pass in control valves known in the prior art is primarily controlled by the rate of movement of the valve plunger although the ports may be arranged so that it is more or less gradually closed. Such graduation is ineffective if the operator moves the valve rapidly. Abrupt closure of the by-pass results in the pump being abruptly subjected to full load. This abrupt action of previously known valves results in shock loading in the pump and the allied hydraulic system. These shock pressures may cause extensive damage to the hydraulic system and erratic operation of the motors. It is the purpose of this invention to prevent the abrupt loading of the pump regardless of the rate of valve movement.

This result is accomplished by the use of a novel unloading valve whose operation is controlled by a pilot flow through a by-pass connected as before. The unloading valve controls flow between the supply connection and the sump. The valve is yieldingly biased toward its seat and is biased open by a motor charged from said by-pass. A metering orifice or vent is provided between the motor chamber or the by-pass and the sump connection. Thus, when the by-pass is closed by the shifting of any valve from its neutral position, pressure in the motor chamber is dissipated at a rate dependent on the size of the metering orifice.

The valves which control flow through the pilot passage in a plunger type of control valve, comprise a plurality of slots formed in the surface of the valve plunger parallel to its axis. These slots in the neutral position of a valve bridge two anular grooves formed in the valve bore. In order to provide for a gradual closing of the pilot passage, the slots in each valve plunger are of different lengths so that flow through them is cut off serially as the valve is moved from its neutral position. It has been the practice in the past to provide such gradual closing of ports controlled by a valve plunger. However, such graduation usually results in a marked lengthening of the valve bore and the valve plunger as well as an enlarged valve stroke between its neutral and a motor actuating position. The graduating feature of the valves in the pilot passage of the present invention does not result in an appreciable lengthening of the valve or its stroke, because the flow which occurs through the pilot passage is small in amount and therefore a minor difference in the lengths of the slots results in good graduation.

A relief valve is also provided. This valve is spring-biased against its seat and normally inhibits flow between the supply connection and the motor chamber of the unloader valve. When supply pressure exceeds a desired value the relief valve is unseated, thus admitting pressure liquid to the motor chamber whereby the unloader valve is quickly opened.

One of the important characteristics of the invention is that none of the normal operating characteristics of a parallel or series-parallel control valve is sacrificed because of the use of the piloted unloader, characteristic of control valves built in accordance with the invention.

The invention may also be used with a multiple valve of the series-parallel type.

Three preferred embodiments of the invention will be described having reference to the accompanying drawings in which:

Figs. 4, 5, 6 and 7 are fragmentary sectional views showing enough of the housing so that the porting may be understood and in each figure a different valve plunger is shown. In Figs. 4, 5 and 7 certain parts have been omitted in the interest of clarity, notably the check valves.

The drawings are schematic to the extent that for ease of illustration, all of the ports have been illustrated as though they lay on the same plane. It will of course be apparent that in the actual valves these ports need not be on the same plane.

Figure 1:
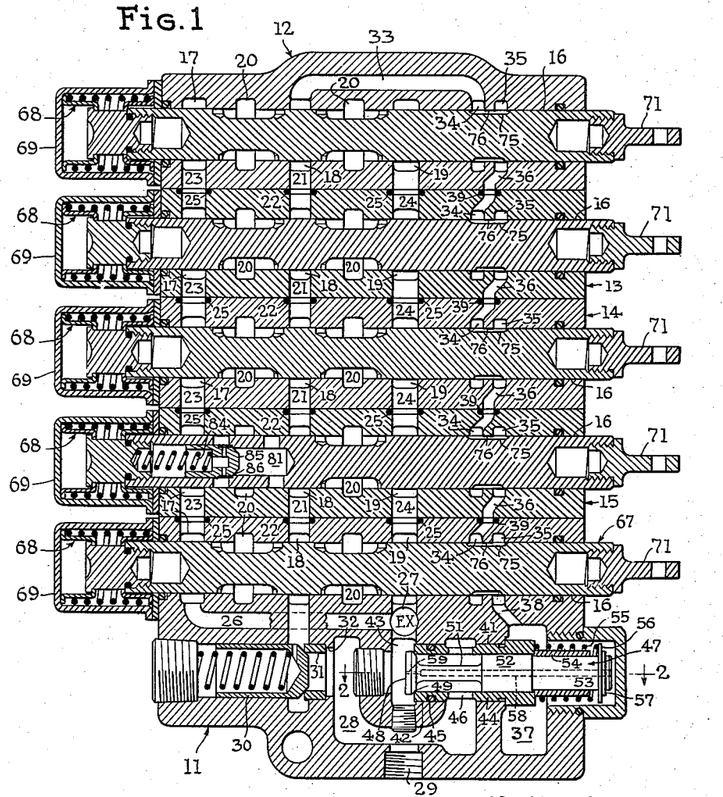
Fig. 1 is a sectional view of a control valve of the parallel type embodying the invention.

As shown in Fig. 1, the valve comprises a sectional housing made up of a first end section 11, a second end section 12 and three intermediate sections 13, 14 and 15. Each section includes a valve bore 16. The valve bore in each section is identical with that in the other sections. Encircling each bore are three spaced annular grooves 17, 18 and 19. Intermediate grooves 17 and 18 and grooves 18 and 19 are grooves 20, each of which is adapted for connection with a motor space through flow passages not shown. The grooves 18 are connected by cored passages 21 to form an inlet manifold which extends through the valve bank. A sealing ring 22 encircles each passage 21 and prevents leakage between the mating surfaces of valve sections. Grooves 17 and 19 are similarly connected to form exhaust manifolds by passages 23 and 24 respectively. A sealing ring 25 similar to 22 is provided between each pair of sections and encircles passages 23 and 24. A passage 26 extends between the grooves 17 and 19 in the end section 11. An exhaust connection 27 extends from passage 26 to a sump, not shown.

End section 11 includes an inlet chamber 28 having a threaded opening 29 into which an inlet or pressure connection may be threaded. A valve seat bushing 31 is pressed into an opening 32 between the chamber 28 and the manifolded passages 21. A check valve 30 is spring-biased against seat 31. It opens to permit flow from chamber 28 to passage 21 and closes against reverse flow.

In end section 12 a passage 33 extends from passage 21 to a groove 34. A second groove 35, spaced from groove 34 also is formed in valve bore 16. Similar grooves 34 and 35 are formed in each of the valve bores. Cored passages 36 are formed in each section so each groove 35 is connected with a groove 34 in the adjacent section. The groove 35 in the end section 11 is connected with a motor chamber 37 by a passage 38. An O-ring 39 encircling passage 36 is provided between adjacent sections. An opening 41 is provided in the wall which separates the motor chamber 37 and the inlet chamber 28. An opening 42 alined with opening 41 is formed in the partition which separates chamber 28 and exhaust chamber 43 which is in open communication with the exhaust connection 27. A cylinder bushing 44 is mounted in alined openings 41 and 42. An O-ring 45 seals against leakage between chambers 28 and 43. Radial ports 46 are formed in bushing 44 and communicate with inlet chamber 28. A combined motor piston and valve assembly 47 is reciprocable in bushing 44.

The assembly 47 includes a valve member 48 which coacts with a seat 49 formed on the end of bushnig 44. Valve member 48 is connected by a reduced diameter portion 51 of assembly 47 to motor piston 52. A second portion 53 of reduced diameter is provided and is encircled by sleeve 54 which acts as a spacer to limit movement of the valve in its opening direction. A spring 55 reacts between the end of bushing 44 and a collar 56 retained on portion 53 by a snap ring 57. Spring 55 biases valve 48 closed. A bore 58 extends from end to end through assembly 47 and is provided with a metering orifice 59.

Figure 2:
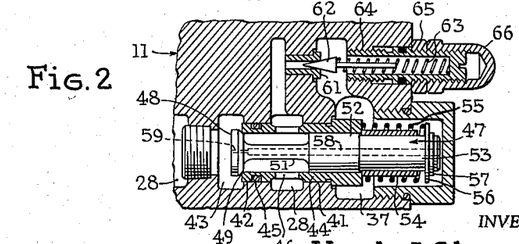
Fig. 2 is a fragmentary sectional view taken on line 2—2 of Fig. 1.

Refer now to Fig. 2. A valve seat bushing 61 is pressed into an aperture in the partition separating chambers 28 and 37. A relief valve member 62 is biased by spring 63 to close against the valve seat 61. The compression of spring 63 is adjustable by means of a threaded spring seat 64 and lock nut 65. Reference numeral 66 indicates a cap nut to prevent tampering with the spring adjustment.

The plunger valves which may be used in the valve bores 16 are shown in detail in Figs. 3 through 7.

Figure 6:
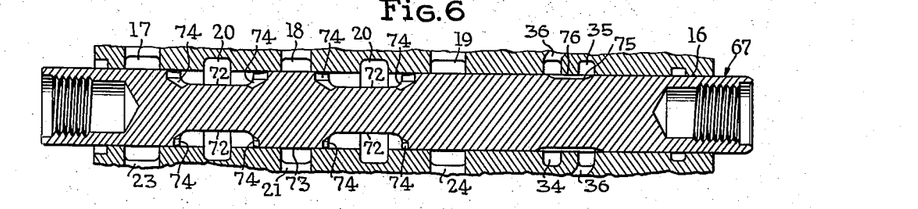

Referring first to Figs. 1 and 6, Fig. 6 shows the valve used in section 11 of Fig. 1. The plunger valve 67 is fitted into bore 16. As shown in Fig. 1, the left-hand end of the plunger valve is threaded to receive the central member of a conventional valve-centering spring assembly 68. Assembly 68 reacts against the plunger valve 67 between the section 11 and a cup 69, secured to the section 11. It serves to limit valve motion in each direction from the position shown and to return the valve to the illustrated neutral or hold position. A fitting 71 for connection with valve actuating means, not shown, is provided at the right-hand end of the valve 67. Of course, the position of fitting 71 and assembly 68 may be reversed. Each plunger valve is provided with a similar centering spring assembly 68 and fitting 71. These parts are omitted from Figs. 3–7.

Refer again to Fig. 6 in which only the valve 67 is shown. Valve 67 is encircled by two relatively wide grooves 72 which are separated by a land 73 which is closely fitted to the bore 16. Notches 74 are provided at the edge of the grooves 72. These notches are of varying depth and axial extent, and provide a gradual closing of the ports controlled by these edges. Formed in the surface of the valve 67 adjacent grooves 34 and 35 is a plurality of shallow axial slots 75. These slots 75 are of different lengths, but are symmetrical about a line midway between the encircling grooves 34 and 35. These slots 75 coact with the land 76 between grooves 34 and 35 to control the flow between these grooves. The difference between the lengths of these slots provides a gradual stopping of this flow when the valve 67 is moved either to the left or to the right.

Figure 7:
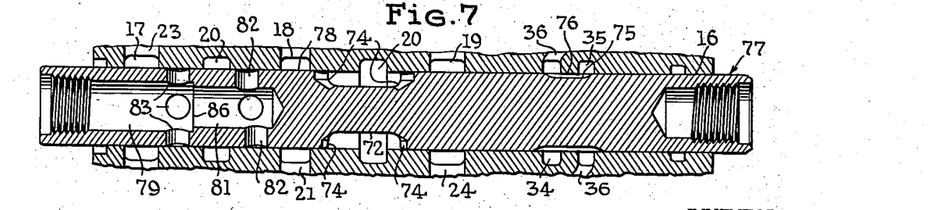

Fig. 7 shows a plunger valve 77 of the type shown in section 15 of Fig. 1. This valve is similar to valve 67. It includes a portion 78 similar in function to the land 73. To the right from portion 78 the valve 77 is identical with that shown in Fig. 6. Valve 77 is provided with a bore 79 having a reduced diameter portion 81. A set of radial ports 82 communicates with portion 81. These ports are slightly axially offset from one another whereby gradual port opening is provided. A second set of radial ports 83 is provided and communicates with the bore 79, but not in the reduced diameter portion 81. Referring to Fig. 1, it will be seen that the central member of assembly 68 closes the open end of bore 79 and acts as a seat for a spring 84 which biases a check valve 85 against the shoulder 86 formed at the end of reduced diameter portion 81; the shoulder serves as a valve seat.

Figure 3:
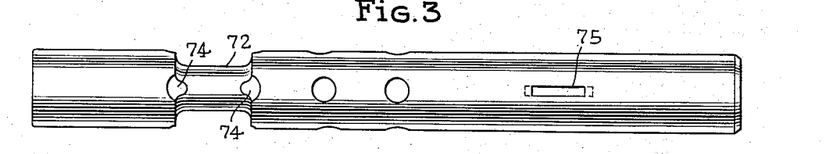
Fig. 3 is an elevation of a plunger which may be used in any of the bores of the control valve of Fig. 1.
Figure 4:
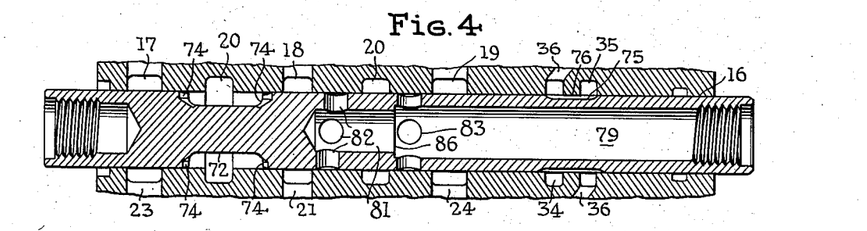
Figure 5:
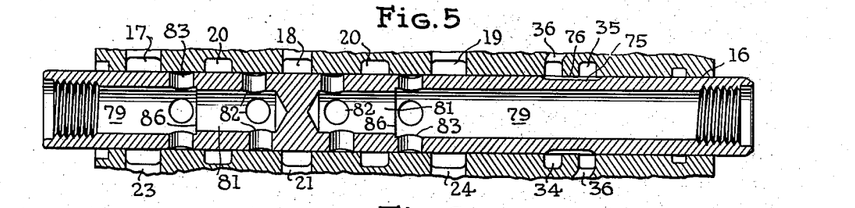

The valve shown in Fig. 4 is similar to the valve of Fig. 7, but its porting is reversed. This same valve is shown in elevation in Fig. 3 to show the milled slots 75 which are characteristic of all the valve plungers shown in Fig. 1. The valve shown in Fig. 5 is formed with both ends constructed in the same fashion as the left-hand end of the valve shown in Fig. 7.

The embodiment illustrated in Fig. 1 does not embody control valves for single-acting motors. It will be obvious such valves could be used if desired.

Figure 8:
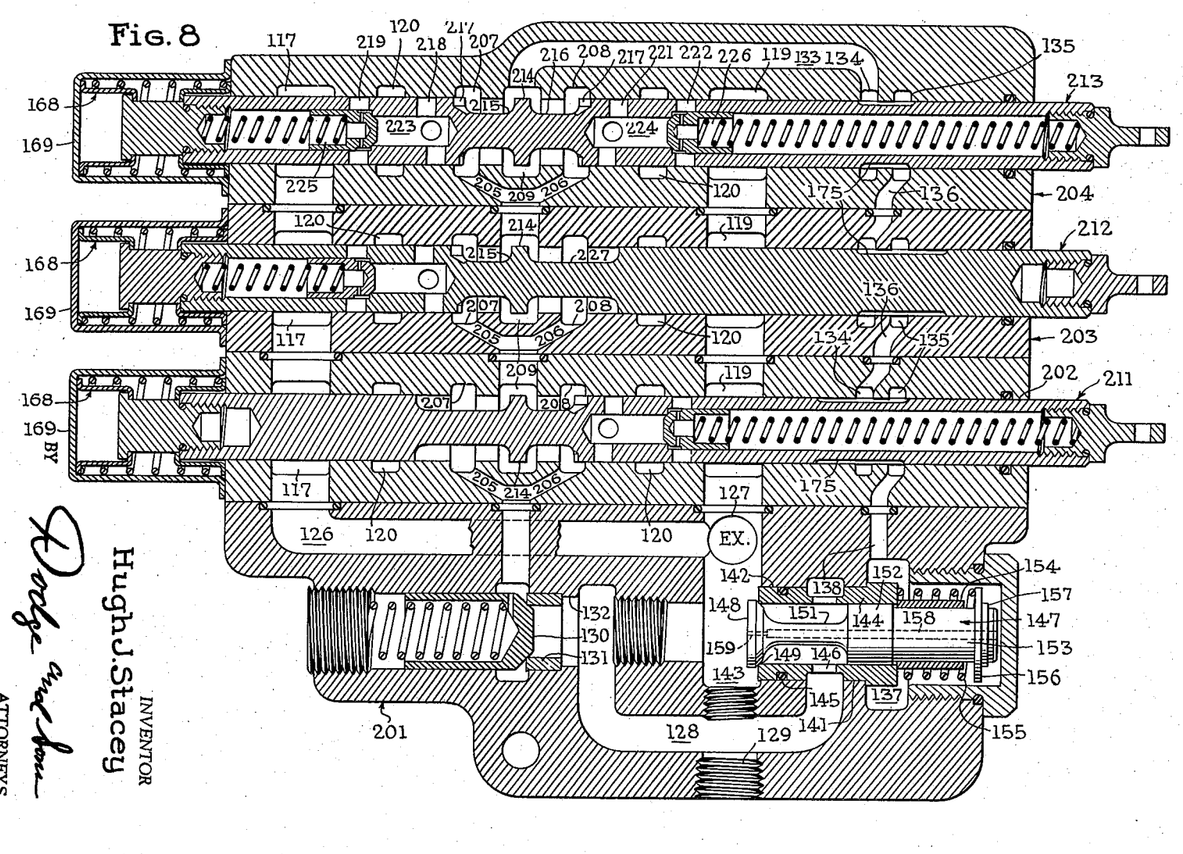
Fig. 8 is a sectional view of a control valve of the series-parallel type embodying the invention.

The multiple valve shown in Fig. 8 is of the series-parallel type. Since it is basically quite similar to the valve of Fig. 1, reference numerals to which 100 has been added are used to denote parts which have counterparts in the valve of Fig. 1. The parts so denoted perform the same functions as do their counterparts, and the structural arrangement is unchanged except for dimension and some slight change in their relative positions.

Parts having reference numerals higher than 200 are described in detail since it is in them that the difference between the valves of Figs. 1 and 8 is found.

The valve of Fig. 8 includes an end section 201 which includes the inlet chamber 128 and the unloader valve 147 and relief valve not shown in Fig. 8. The first valve bore 202 of the multiple valve is formed in a section separate from the end section 201 although it might be formed integrally therewith. There is a second intermediate section 203 and an end section 204. The valve bores are encircled by parallel connected exhaust grooves 117 and 119, by motor grooves 120 and grooves 134 and 135.

The inlet passage extends from check valve 130 serially to each valve section of the multiple valve. In each section it includes branching passages 205 and 206 which communicate with grooves 207 and 208 respectively. A central groove 209 encircles each valve bore and is in direct, open communication with the branching passages 205 and 206 in the next valve in the series at all times.

The valve plungers 211, 212 and 213 are formed with a central land 214 and grooves on each side thereof. The valve 213 has symmetrical grooves 215 and 216. The outer edges of these grooves are notched at 217. Notches 217 perform the same function as notches 74 in the valve of Fig. 1. Between each of the grooves 215 and 216 and the corresponding end of the valve plunger 213, are two axially spaced sets of ports 218 and 219, and 221 and 222 which communicate respectively with bores 223 and 224. Sets 218 and 219 are separated by a check valve 225 in bore 223 and sets 221 and 222 by a check valve 226 in the bore 224.

The grooves 215 and 227 of plunger valve 212 are asymmetric, the groove 227 being wider. Also the right-hand end of valve 212 is not counterbored. This installation is typical of the use of a valve plunger in a multiple valve which controls a single-acting motor. If the operator shifts this plunger to the left, the supply connection is not blocked as it would be when valve 213 is shifted in either direction.

The porting of valve 211 is a mirror duplicate of the porting of valve 212.

Figure 9:
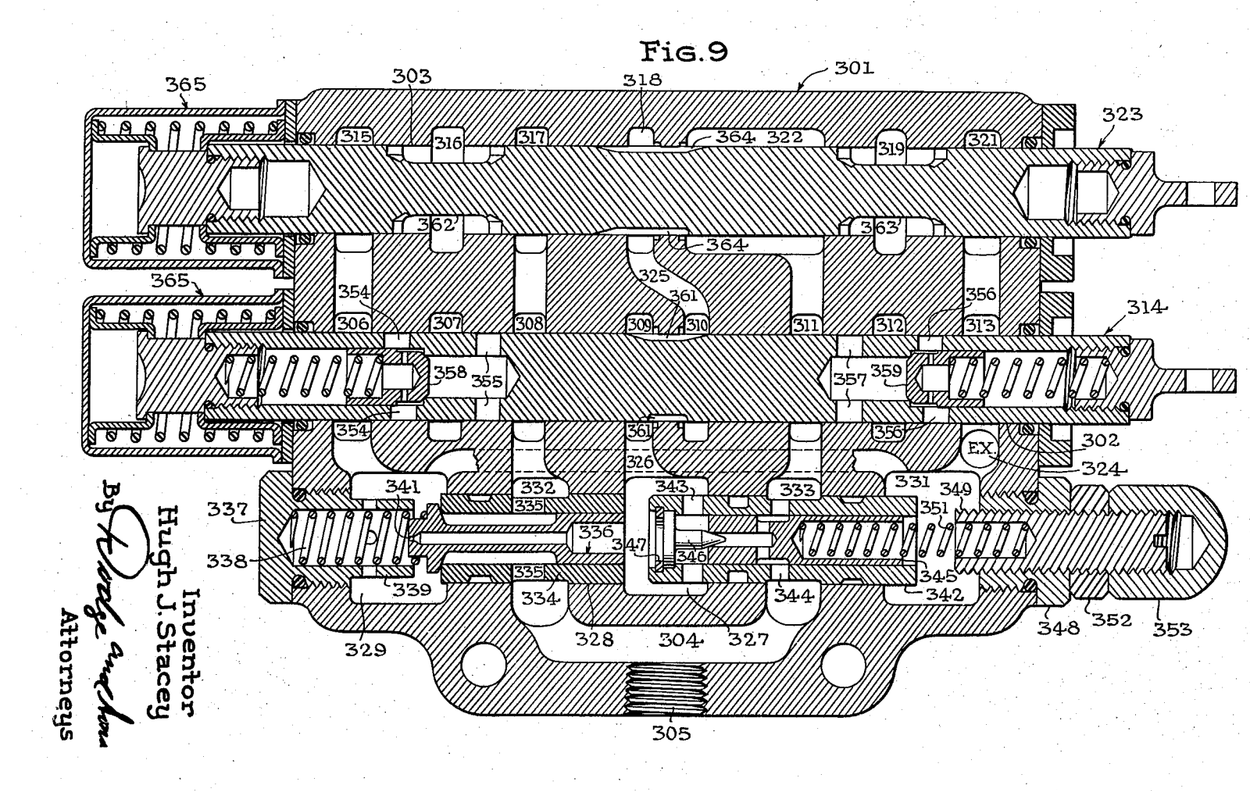
Fig. 9 is a sectional view of a control valve embodying a modified form of the invention.

Fig. 9 shows a modified embodiment of the invention in a control valve of the parallel type. This valve comprises a bank of only two valves, but might include more or less than that number. Where more than one valve is used a sectional construction similar to that used in the embodiments of Figs. 1 and 8 could be used.

As illustrated in Fig. 9, the valve comprises a housing 301 having two valve bores 302 and 303 extending therethrough. It also includes a supply chamber 304 adapted for connection to a source of pressure fluid, not shown, by a threaded connection 305.

Valve bore 302 is encircled by eight annular grooves 306, 307, 308, 309, 310, 311, 312 and 313. These grooves are arranged in pairs 306 and 313, 307 and 312, 308 and 311, and 309 and 310, which are symmetrically located about the midpoint of that bore.

A plunger valve 314 is reciprocable in the bore 302 and controls communication between these ports.

The valve bore 303 is encircled by six narrow annular grooves 315, 316, 317, 318, 319 and 321 and by a wide groove 322. The pairs of grooves 315 and 321 and 316 and 319 are arranged symmetrically about the midpoint of bore 303. A valve plunger 323 controls communication between the grooves.

Communicating with the inlet chamber 304 is an inlet manifold which includes two branches, one branch communicating with inlet grooves 308 and 317 and the other with inlet grooves 311 and 322. An exhaust manifold communicates with an exhaust connection 324 and includes two branches, one including exhaust grooves 306 and 315 and the other including exhaust grooves 313 and 321. Grooves 307, 312 and 319 are provided with motor ports not shown. The groove 316 has a motor port which is plugged, since in the illustrated embodiment valve 323 is designed to control a single-acting motor. A pilot passage 325 is provided between grooves 318 and 310 and pilot passage 326 similarly interconnects groove 309 and a motor chamber 327.

The housing 301 is provided with a bore 328 which extends therethrough. This bore is encircled by grooves 329 and 331, in communication with the exhaust manifold, by grooves 332 and 333, in communication with the inlet manifold, and by motor chamber 327. A combined valve seat and bushing 334 is pressed into bore 328. Bushing 334 has radial ports 335 registering with groove 332. A combined unloader valve and piston assembly 336 is reciprocable in bushing 334. A plug 337 closes the end of bore 328 adjacent bushing 334. A spring 338 reacts between plug 337 and the assembly 336 and urges it in a valve closing direction. Plug 337 includes a ported skirt 339 which serves to limit opening movement of the valve. A metering orifice 341 controls flow through assembly 336 between the motor chamber 327 and exhaust groove 329.

A second bushing 342 is pressed into the other end of bore 328. This bushing 342 includes two sets of radial ports 343 and 344 as shown. A ported valve member 345 is guided in bushing 342. A second valve member 346, arranged to coact with member 345, is retained against a shoulder on bushing 342 by a snap ring 347. An internally and externally threaded annular plug 348 is screwed into the end of bore 328. An adjusting screw 349 is carried in this annular plug and acts as a seat for spring 351 which reacts against the member 345 to urge it toward the valve member 346. A lock nut 352 and cap nut 353 are provided on the outer end of adjusting screw 349.

The valve plunger 314 has two pairs of radial ports 354 and 355, and 356 and 357, the ports in each pair being axially spaced but connected together for one way flow communication past check valves 358 and 359 respectively. In the illustrated neutral position of the valve 314 these ports are all blocked at the bore surface. Centrally of valve 314 are several longitudinal slots 361 of unequal lengths which are symmetrically aranged relatively to a plane normal to the axis of the bore 302 and passing through a point mid-way between grooves 309 and 310.

Valve 323 is provided with encircling recesses 362 and 363 which in the illustrated neutral position of valve 323 are in communication only with corresponding motor ports 316 and 319. Valve 323 is provided with longitudinal slots 364 at its center. These slots are not symmetrically arranged in contrast to slots 361. Each of th valves 314 and 323 is provided with a conventional centering spring assembly 365 which at all times biases the valve toward its neutral position.

The operation of the valves will be described referring first to Figs. 1 and 2. Liquid under pressure is supplied to the inlet chamber 28 from a pump not shown. Part of the liquid flows past the check valve 30 and serially through the connected passages 21 and groove 18 into the passage 33. From the passage 33, this liquid passes to a groove 34, through the slots 75, to the groove 35, to passage 36, and so on down to the passage 38 which extends into the motor chamber 37. The slots 75 have a flow capacity which is markedly less than the total output of the pump. Liquid is dissipated to the exhaust chamber 43 through a metering orifice 59. This metering orifice 59 has a still smaller flow capacity than slots 75. Therefore, when pressure liquid is flowing through throttled pilot connection, which includes the grooves 34 and 35, the slots 75 and passages 36, a pressure is developed in the motor chamber 37 which reacts against the piston 52 to unseat the valve 48 by overcoming the bias of the spring 55. Opening of the valve 48 causes a major portion of the pump's output to be passed directly from the inlet chamber 28 to the exhaust chamber 43, which is in open communication with the exhaust or sump connection 27. When the valve 48 is unseated, flow occurs between the chamber 28 and 43 without any substantial restriction, whereby heating of the liquid is avoided.

When one of the control valves, for example the valve 67 is shifted away from its neutral position in either direction, the land 76 between the groves 34 and 35 throttles the flow through the slots 75, thereby diminishing the rate of flow through the pilot connection to the motor chamber 37. Continued movement of the valve 67 away from its neutral position results in completely cutting off flow through the pilot connection. If the valve is moved slowly, this final stoppage of flow is gradual because the lengths of the slots 75 around the valve 67 are unequal. Because of this inequality, and because only a minor portion of the total pump output is passed through the pilot connection, little or no pressure shock occurs as a result of closure of the pilot connection. Throttling and stoppage of flow to the motor chamber 37 permits the pressure in this chamber to be dissipated through the metering orifice 59. This absence of shock pressures in the system as a result of the pump's being loaded, results in improved operation of the motors and makes it easier to keep the system liquid tight.

If the valve 67 is shifted from its neutral position, one of the grooves 20 is brought into communication with the inlet groove 18 and the other groove 20 is brought into communication either with exhaust groove 17 or 19 depending on the direction in which it is shifted. If the valve 67 controls a double-acting piston motor, one of the motor working spaces will be in communication with one of the grooves 20, and the other working space will be in communication with the other groove 20.

The operation of the device when a valve such as valve 77 is shifted, is similar to that which occurs as a result of the shift of a valve 67. The flow through the pilot connection is stopped in the identical fashion. If valve 77 is shifted to the right, as shown in Fig. 7, radial ports 82 will be brought into communication with the inlet groove 18 and radial ports 83 will be brought into communication with the left-hand motor groove 20. Thus, liquid under pressure will pass through the ports 82, past the check valve 85, through the ports 83, into the motor groove 20, to charge the associated motor chamber. At the same time, the right-hand groove 20 is connected through the groove 72 to the discharge passage 19, whereby the associated motor is vented.

If the valve 77 is shifted to the left, the right-hand motor groove 20 is connected to receive liquid under pressure from the groove 18 through a groove 72. Similarly, the radial ports 82 are brought into communication with the left-hand motor groove 20 and the ports 83 communicate with the exhaust passage 17, whereby liquid may be exhausted through this motor groove 20, through the ports 82, past the check valve 85 and through the ports 83.

The porting established by the valve shown in Figs. 3, 4 and 5 will be apparent from what has been said concerning Figs. 6 and 7.

As shown in Fig. 2, the pressure existing in inlet chamber 28 reacts against the spring biased relief valve 62 to urge it in an opening direction. Whenever this pressure exceeds a desired maximum value, the valve 62 will be unseated and thereby place the chamber 28 in communication with the motor chamber 37. The development of pressure in motor chamber 37 due to the unseating of the relief valve 62, causes the valve 48 to be unseated to relieve the excess pressure.

It should be noted that the position of the valve 48 when it is unseated is controlled by the pressure which exists in chamber 37, which is a function of the rate at which liquid is supplied to the motor chamber 37, and the rate at which it is dissipated from that chamber. The opposing bias of the spring 55 becomes greater as the valve 48 is opened further, and therefore the valve 48 will assume an open position which establishes an equilibrium pressure in the chamber 37 which is determined by the rate of liquid supply to, and exhaust from, the chamber 37. A similar equilibrium pressure is created when the relief valve 62 is unseated.

The operation of the combined unloader and relief valve shown in Fig. 8 is identical with the operation of that same valve as shown in Fig. 1. The difference between these two embodiments resides in features of the multiple control valve with which the motor is used. As has been said earlier in the specification, Fig. 1 is a control valve of the parallel type. Fig. 8, on the other hand, is a control valve of the series-parallel type. The multiple valves of both Figs. 1 and 8 include exhaust manifolds to which the exhaust grooves 17, 19 and 117, 119 are connected.

In Fig. 1 the inlet grooves 18 form a part of an inlet manifold, from which the series of valves is supplied with pressure in parallel flow relationship. In the multiple valve of Fig. 8, on the other hand, the inlet passage is connected through the valves in series.

When one of the plunger valves is shifted from its neutral position, the pilot connection 134, 175, 135 and 136 is throttled in the same fashion as was the pilot connection of Fig. 1. At the same time, communication is established between one of the motor ports and the supply connection, and between the other motor port and an exhaust connection. Consider plunger valve 213 as an example. Let it be assumed that the valve 213 is shifted to the left. This shifting motion brings the radial ports 218 into registration with the left-hand motor groove 120 and the radial ports 219 into registration with the exhaust groove 117. Thus the motor space associated with this motor groove is vented. The land 214 on the valve plunger comes into contact with the land defined between the grooves 207 and 209, whereby the flow of liquid through the passage 205 is terminated. At the same time, the land between the grooves 209 and 208 engages the valve plunger to prevent flow from groove 208 to groove 209. The radial ports 221 are placed in communication with the groove 208 and the ports 222 are placed in communication with the right-hand motor port 120 whereby pressure from the inlet passage is admitted through the ports 206, 221 past the check valve 226 and through the ports 222 into the motor chamber 120.

If the valve 213 is shifted to the right, these connections are reversed. It will be noticed that when the valve 213 is shifted to its motor actuating position in either direction, flow through the pilot connection is blocked. This blocking is incidental since primary control of the rate of flow through the pilot connection is established by the slots 175. The valves 211 and 212 are mirror duplicates of one another and each is intended to control a single-acting piston motor. The right-hand motor port 120 of the valve 212 is not provided with an open connection, therefore, when the valve is shifted to the left to vent the motor connected to the left-hand motor port 120, it is desired that flow to the pilot connection will not be terminated. For this reason, the groove 227 is made wide enough so that in the extreme left-hand position of the valve 212, liquid will flow through the passage 206 to the groove 208, through the groove 227, to the groove 209 and thence to the pilot connection. This means that shifting of the valve 212 to the left in no way affects the opening and closing of the unloader valve 148.

When the valve 212 is shifted to the right, the land 214 on the valve plunger engages the land between the grooves 208 and 209. At the same time, communication is established between the inlet groove 207 and the left-hand motor groove 120, through radial ports and past a check valve in the same fashion that this communication was established between the corresponding ports in the valve 213.

The valve 211 is the same as valve 212 except that the left-hand motor port 120 is not connected to a motor space, whereas the right-hand groove 120 is connected to a motor space. It will be noted that the slots 175 of the valve 212 are extended to the right a distance which is approximately equal to the distance which the valve may shift to the left. This means that flow through the pilot connection is not cut off by leftward shifting of the valve 212. Similarly, the slots 175 of the valve 211 are elongated to the left so that flow through the pilot connection is unaffected when the valve 211 is shifted to the right.

The operation of the valve illustrated in Fig. 9 will probably be apparent from the foregoing descriptions of the operation of the other embodiments of the invention. Pressure liquid is supplied to the inlet chamber 304. With valves 314 and 323 in their illustrated position fluid follows two paths from chamber 304. A minor or pilot flow passes through the inlet manifold to groove 322, through slots 364 to groove 318, thence through passage 325, groove 310, slots 361, groove 309, passage 326 to motor chamber 327. Fluid escapes from motor chamber 327 at a rate determined by the size of metering orifice 341. This restricted rate of flow causes pressure in chamber 327 to build up sufficiently to overcome the bias of spring 338 to unseat the valve of assembly 336, whereby fluid may pass directly to the exhaust manifold from the inlet chamber 304 through the ports 335 and the bushing 334.

The pilot flow to motor chamber 327 is terminated if valve 314 is shifted away from its neutral position in either direction since slots 361 will be blocked. Similarly, pilot flow will be cut off if valve 323 is shifted to the left from its illustrated position. Cessation of pilot flow to the motor chamber 327 results in dissipation of pressure fluid from that chamber through the metering orifice 341 and the valve assembly 336 is seated by spring 338 and the inlet manifold receives the entire output of the pump supplying fluid to the inlet chamber 304. The pump is not similarly loaded when valve 323 is shifted to the right because the slots 364 are not blocked.

When valve 314 is shifted to the right, motor connected groove 307 receives pressure fluid through interconnected radial ports 355 and 354 from the inlet groove 308. At the same time, motor groove 312 is connected in flow communication with the exhaust groove 313 by way of radial ports 357 and 356. When valve 314 is shifted in the opposite direction, groove 307 is placed in communication with exhaust groove 306, while groove 312 is placed in flow communication with the inlet groove 311.

Valve 323 when shifted to the left places the motor groove 319 in flow communication with the inlet groove 322 by way of the groove 363 in the valve member. When valve 323 is shifted to the right, motor groove 319 is in communication with exhaust groove 321 by means of groove 363. It will be apparent that motor groove 316 is similarly connected selectively with groove 317 or groove 315 by groove 362. In the preferred embodiment, the motor port from this groove is plugged so no flow results from this. If desired the motor groove 316 could be connected to a motor space. In such event it would be necessary to use a slightly modified form of valve in which the axial slots 364 would be identical to slots 361.

It should be noticed that the valve plungers 314 and 323 can be used in either bore and that they can be removed and reversed end for end without changing the function of the valves in any way, except that the single-acting motor would be connected to the port 316 instead of to port 319 as in the illustrated valve. The valve assemblies in bore 328 also can be reversed.

The valve member 345 functions as a relief valve. It is biased away from valve member 346 by pressure in the inlet chamber 304. Excessive pressure in this chamber, which occurs only when a motor is in operation, will cause the bias of spring 351 to be overcome and permit fluid to pass from the inlet chamber 304 through ports 344, ports in the member 345 and ports 343 to the motor chamber 327. Fluid pressure will then rapidly build up in the motor chamber 327 and again unseat the piston valve assembly 336 to unload the pump.

The cardinal advantage afforded by use of the present invention is the ability to load the pump without the creation of damaging pressure shocks in the system. The creation of such pressure shocks can be avoided in conventional plunger type control valves by the use of ports which are axially staggered so that the motor ports are opened gradually. Such staggering of the motor ports is undesirable because it results in an elongation of the valve plunger and the motion of the valve plunger in order that effective gradual loading can be achieved. A second disadvantage is the fact that to be effective, the rate of movement of the valve plunger should not be overly rapid. The present invention, while it does make use of staggered ports and edges of the plunger valve, overcomes the second disadvantage because only a pilot flow is terminated when the valves assume motor supplying positions. The staggered arrangement of the ports of the preferred embodiments of the present invention is primarily important because it controls the rate of exhaust flow from the motor and exerts a stabilizing influence on motor action.

The provision of throttling slots in the pilot connection of various lengths is also useful in preventing the creation of pressure shocks, because it affords the slow closure of the pilot connection when the valve or valves are shifted to an active position. However, the more important feature tending to eliminate these pressure shocks is the fact that the flow through the pilot connection comprises only a minor portion of the output, and this rate of flow is markedly less than it is in the ordinary multiple control valve.

Gradual closure of flow through the pilot passage can be achieved by making the slots 75, 175 and 361 in any one valve of only slightly different length. The reason that good graduation is achieved with only slight difference in length, is the fact that only a minor portion of the pump's output flows through the pilot connection. Since the difference in the lengths of the slots is only slight to achieve good graduation, the size of the valve is not greatly enlarged by the inclusion of this feature. This is an important advantage, particularly when it is remembered that in conventional multiple control valves, gradual closure of the flow passages could be achieved only by considerably increasing the length of the valve and the valve bore. It is an important commercial consideration that the size of a multiple bank control valve be kept to a minimum.

The advantages which have been pointed out for this invention are available fully in all of the illustrated embodiments which are exemplary but deemed desirable to support the statement that the invention may be used in multiple valves of both the parallel type and the series-parallel type. The control valve can be made up of individual valves, some of which are connected together in the series-parallel arrangement and some of which are connected together in the parallel arrangement. In this last type of valve, common parallel exhaust manifolds would be used and the series inlet passage and the parallel connected inlet manifold would be connected end to end.

What is claimed is:

1. In a bank of control valves having a supply connection and an exhaust connection, each control valve controlling flow to and from a motor port and shiftable selectively to any one of three positions namely a neutral position in which the motor port is isolated from the supply and exhaust connections, a second position in which the motor port is in flow communication with said supply connection and a third position in which the motor port is in flow communication with the exhaust connection; an unloader valve comprising in combination means affording a flow path between said supply and exhaust connection; a valve member biased to close this flow path; expansible chamber motor means connected with said valve member and effective when supplied with pressure fluid to act in opposition to said bias and unseat the valve member; means affording a restricted flow passage from the expansible chamber to the exhaust connection; means affording a pilot flow connection of greater flow capacity than the restricted passage, said pilot connection extending between said supply connection and said chamber; valve means in said pilot connection operatively connected with a corresponding control valve so as to close said pilot connection when the associated control valve is in said second position.

2. In a control valve including a supply connection, an exhaust connection and at least one motor connection controlled thereby; means affording a flow path from the supply connection to the exhaust connection; valve means biased to close said path; expansible chamber motor means effective when charged with pressure fluid to open the valve means in opposition to said bias; a restricted vent from the expansible chamber; means affording an inlet to the expansible chamber from said supply connection of larger flow capacity than said vent; valve means operable to interrupt flow through the inlet to said chamber comprising a valve connected with the control valve so as to be closed whenever a motor connection controlled thereby is charged with fluid under pressure.

3. The combination defined in claim 1 and means affording a flow path directly from said supply connection to said chamber; a valve seat in said flow path; and a valve yieldingly biased to close said flow path.

4. A combined unloader valve and hydraulic control valve comprising in combination means affording a supply connection to said control valve; means affording an exhaust connection from said control valve; passage means extending between said connections; a valve seat in said passage means; an unloader valve member biased toward said seat; a motor connected with said valve member and when actuated moving said valve in opposition to said bias; inlet means to said motor through said control valve; means affording a restricted exhaust from said motor; and valve means operable by movement of said control valve to close said inlet means.

5. The combination defined in claim 4 and means affording a flow path directly from said supply connection to said motor; a valve seat in said flow path; and a valve yieldingly biased to close said flow path.

6. A combined unloader valve and a multiple valve comprising a plurality of control valves, each of said control valves having a supply connection, two motor connections, and two exhaust connections, means affording a flow connection to said supply connections, and an exhaust manifold means connected in parallel flow relation with all of the exhaust connections, each control valve being selectively shiftable to one of three operating positions, namely a neutral position in which the motor connections are isolated from both the supply and exhaust connections, a second position in which one motor connection is connected with the exhaust connection and the other with the inlet connection, and a third position in which the connections established in the second position are reversed; means affording a flow path between the said supply connection and the exhaust connection; a valve biased to close said flow path; valve motor means connected to move said valve in opposition to said bias; means affording a restricted vent from said valve motor to the exhaust manifold; means affording a pilot flow path to said motor of larger capacity than said vent and of less capacity than the flow connection to said supply connections; and a plurality of valves serially arranged in said pilot flow path each operatively connected with a corresponding control valve and open when the corresponding control valve is in its neutral position and closed when it is in said second or third position.

7. The combination defined in claim 6 and means affording a flow passage directly from said supply connection to said motor means; a valve seat in said flow passage; and a valve yieldingly biased to close said flow passage.

8. The combination defined in claim 6 in which the means affording a flow connection to said supply connections is a manifold connected in parallel flow relation with said supply connections.

9. In a multiple valve of the type including a plurality of individually operable control valves in which each of the control valves comprise a ported valve seat bore and a plunger valve reciprocable therein, the seat ports in at least some of said control valves including an inlet port, two exhaust ports and two motor ports, each of said motor ports being located between the supply port and a different one of the exhaust ports, each of said valve plungers being individually shiftable to any one of three positions, namely, a neutral position in which said motor ports are blocked, a second position in which one of the motor ports is connected with an exhaust port and the other motor port is connected with the supply port, and a third position in which the communications established in the second position are reversed, means affording a flow communication to the supply ports, an exhaust manifold to which all of said exhaust ports are connected in parallel flow relation, an unloader valve comprising in combination means affording a flow connection between the exhaust manifold and the means affording flow communication to the inlet connection, a valve therein; means biasing said valve closed; fluid pressure motor means effective when charged with fluid pressure to move said valve in opposition to said bias, a restricted vent from said motor means to the exhaust manifold; means affording a less restricted inlet connection to said motor; and a plurality of pilot valves in the last mentioned means, each of said plurality of valves being connected with a corresponding control valve and arranged to prevent flow through the inlet to the motor whenever the corresponding control valve is shifted away from its neutral position.

10. The combination defined in claim 9 in which each of the plurality of pilot valves in the inlet to the motor comprise a valve seat which is an extension of the valve seat bore of the associated control valve; and a valve member which is an extension to the plunger valve of that control valve.

11. The combination defined in claim 10 in which the seat of each of said plurality of pilot valves comprises two axially spaced encircling grooves formed in said bore, said valve member having a plurality of circumferentially spaced axial slots in its surface, said slots registering with axial spaced encircling grooves when the control valve is in its neutral position.

12. The combination defined in claim 11 in which said slots are of different lengths and are symmetrical, when the associated control valve is in its neutral position, about a plane normal to the axis of said bore mid-way between the two grooves therein.

13. A combined multiple distributing valve and unloader valve unit for individually controlling a plurality of fluid pressure motors comprising a housing having a common pressure fluid supply, a pressure fluid exhaust connection, and a plurality of valve bores which are substantially parallel, each bore having at approximately midlength port means which are serially connected from bore to bore, said serially connected ports affording a regulatory flow path between supply and exhaust, each bore having symmetrically arranged with reference to said serially connected ports the component parts of three pairs of ports, namely a pair of supply ports, a pair of motor ports and a pair of exhaust ports, the supply ports being connected with the common pressure fluid supply and the exhaust ports with the exhaust connection; independently operable plunger type distributing valves, one associated with each of said bores and each having a neutral position in which said serially connected ports forms a continuous open path and active positions in which said path is closed; an unloading valve which when open connects said common supply with said exhaust connection; biasing means urging said unloading valve in a closing direction; a pressure actuated unloading motor acting in opposition to said biasing means; a connection between said unloading motor and the passage afforded by said serially connected ports; and means affording a restricted vent from said unloading motor, the arrangement being such that the valve plungers are individually reversible end for end with reference to said housing.

14. A multiple distributing valve unit for individually controlling a plurality of fluid pressure motors, comprising housing means having a common pressure-fluid supply, a pressure fluid exhaust connection, and a plurality of valve seats each with at least one supply port fed by the common pressure fluid supply, at least one exhaust port and motor ports; independently operable distributing valves each associated with a corresponding one of said valve seats, and each having a neutral position, and active positions; an unloading valve which when open connects the common supply with said exhaust connection; biasing means for urging said unloading valve in a closing direction; a pressure actuated unloading motor for overpowering said biasing means; and serially connected port means in said distributing valves and seats, affording a regulatory flow path between said supply and exhaust connections, open when all distributing valves are in their neutral positions and closed by displacement of any distributing valve to an active position; and means for subjecting said unloading motor to pressure variations caused by the opening and closing of said regulatory flow path.

15. The combination defined in claim 6 in which the means affording a flow connection to said supply connections comprises a series of flow connection means whereby said supply connections are connected in series flow relation.

16. The combination defined in claim 9 in which one or more of said control valves includes an inlet port, one motor port and one exhaust port and in which said pilot valve corresponding to each of said one or more control valves prevents flow through the inlet to the fluid pressure motor means only when the corresponding control valve is shifted to interconnect said supply port and said motor port.

17. The combination defined in claim 16 in which each of said plurality of pilot valves corresponding to said one or more control valves comprises two axially spaced encircling grooves formed in the bore in which said plunger valve is reciprocable, said valve member having a plurality of circumferentially spaced axial slots in its surface, said slots registering with both of said spaced encircling grooves except when the corresponding valve plunger is in a position in which it interconnects the motor port with the supply port.

References Cited in the file of this patent

UNITED STATES PATENTS

| | | |
|---|---|---|
| 2,057,088 | De Miller | Oct. 13, 1936 |
| 2,289,567 | Berglund | July 14, 1942 |
| 2,489,435 | Robinson | Nov. 29, 1949 |
| 2,586,932 | Gardiner | Feb. 26, 1952 |
| 2,651,324 | Hodgson et al. | Sept. 8, 1953 |
| 2,745,433 | Schneider et al. | May 15, 1956 |